(12) United States Patent
Miao et al.

(10) Patent No.: US 11,513,346 B2
(45) Date of Patent: Nov. 29, 2022

(54) METHOD AND APPARATUS FOR CONTROLLING VIRTUAL REALITY DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinghua Miao, Beijing (CN); Xuefeng Wang, Beijing (CN); Jinbao Peng, Beijing (CN); Lili Chen, Beijing (CN); Hao Zhang, Beijing (CN); Yukun Sun, Beijing (CN); Bin Zhao, Beijing (CN); Xi Li, Beijing (CN); Wenyu Li, Beijing (CN); Zhifu Li, Beijing (CN); Jianwen Suo, Beijing (CN); Longhui Wang, Beijing (CN); Mingyang Yan, Beijing (CN); Shuai Hao, Beijing (CN); Qingwen Fan, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 371 days.

(21) Appl. No.: 16/766,583

(22) PCT Filed: May 24, 2019

(86) PCT No.: PCT/CN2019/088320
§ 371 (c)(1),
(2) Date: May 22, 2020

(87) PCT Pub. No.: WO2020/237421
PCT Pub. Date: Dec. 3, 2020

(65) Prior Publication Data
US 2021/0405356 A1    Dec. 30, 2021

(51) Int. Cl.
*G02B 27/00* (2006.01)
*G02B 27/01* (2006.01)
*G06T 3/00* (2006.01)

(52) U.S. Cl.
CPC ....... *G02B 27/0025* (2013.01); *G02B 27/017* (2013.01); *G02B 27/0179* (2013.01); *G06T 3/0093* (2013.01)

(58) Field of Classification Search
CPC ......... G06T 3/0093; G06T 3/40; G06T 3/403; G06T 3/4038; G06T 3/4053; G06T 7/11;
(Continued)

(56) References Cited

U.S. PATENT DOCUMENTS

| 10,777,014 B2* | 9/2020 | Tang ..................... G06T 1/20 |
| 2015/0264259 A1* | 9/2015 | Raghoebardajal ........................... H04N 5/23238 348/36 |

(Continued)

FOREIGN PATENT DOCUMENTS

| CN | 109298793 A | 2/2019 |
| CN | 109636715 A | 4/2019 |

OTHER PUBLICATIONS

PCT International Search Report, Application No. PCT/CN2019/088320, dated Mar. 2, 2020, 7 pages: with English translation.
(Continued)

*Primary Examiner* — Sultan Chowdhury
(74) *Attorney, Agent, or Firm* — Armstrong Teasdale LLP

(57) ABSTRACT

Embodiments of the present disclosure provide a method for controlling a virtual reality display device, wherein the virtual reality display device includes a display, an optical
(Continued)

system, and a movement controller. In this method, an anti-distortion image is generated based on the original image according to distortion parameters of the optical system. The anti-distortion image includes an effective image area and an invalid image area, wherein the effective image area includes image information of the original image. The movement control information is written into the invalid image area, and the movement control information is used by the movement controller to control the movement of the display. The anti-distortion image is provided to the virtual reality display device.

20 Claims, 3 Drawing Sheets

(58) Field of Classification Search
CPC .... G06T 7/12; G06T 7/60; G06T 7/62; G06T 3/00; G02B 27/005; G02B 27/0025; G02B 27/0068; G02B 27/017; G02B 27/0179; G02B 27/01; G02B 27/0101; G03B 21/145; G03B 21/147; G03B 21/208; G03B 21/2053; H04N 9/3141; H04N 9/3185; H04N 9/3194
See application file for complete search history.

(56) References Cited

U.S. PATENT DOCUMENTS

2018/0365797 A1\* 12/2018 Yu .................... G06T 3/0093
2019/0096077 A1    3/2019 Allu et al.

OTHER PUBLICATIONS

PCT Written Opinion, Application No. PCT/CN2019/088320, dated Mar. 3, 2020, 7 pages.: with English translation of relevant part.

\* cited by examiner

METHOD AND APPARATUS FOR CONTROLLING VIRTUAL REALITY DISPLAY DEVICE

CROSS REFERENCE TO RELATED APPLICATIONS

This patent application is a National Stage Entry of PCT/CN2019/088320 filed on May 24, 2019, the disclosure of which is incorporated by reference herein in its entirety as part of the present application.

BACKGROUND

The present disclosure relates to the field of virtual reality, and in particular, to a method and apparatus for controlling a virtual reality display device, a method for execution in a virtual reality display device, and a virtual reality display device.

Currently, virtual reality display devices are widely used in many fields. Emerging applications are in a field of myopia correction. In a myopia correction system using a virtual reality display device, by controlling a movement of a display in a virtual reality display device, a user is allowed to view images at different distances. When a user views an image at a close distance, a ciliary muscle is in a state of spasm. When a user views an image at a long distance, the ciliary muscle is in a relaxed state. In this way, an adjustment function of ciliary muscle to lens can be exercised to correct myopia.

BRIEF DESCRIPTION

Embodiments of the present disclosure provide a method and apparatus for controlling a virtual reality display device, a method for execution in a virtual reality display device, and a virtual reality display device.

A first aspect of the present disclosure provides a method for controlling a virtual reality display device, wherein the virtual reality display device includes a display, an optical system, and a movement controller. In this method, an anti-distortion image is generated based on the original image according to distortion parameters of the optical system. The anti-distortion image includes an effective image area and an invalid image area, wherein the effective image area includes image information of the original image. The movement control information is written into the invalid image area, and the movement control information is used by the movement controller to control the movement of the display. Then, the anti-distortion image is provided to the virtual reality display device.

In the embodiments of the present disclosure, the movement control information may be indicated by pixel values.

In an embodiment of the present disclosure, writing the movement control information into the invalid image area includes determining pixel values corresponding to the movement control information, and writing the corresponding pixel values into pixels of the invalid image area.

In an embodiment of the present disclosure, the movement control information may include any one of the following: screen movement information; stop movement information, and screen position restoration information.

A second aspect of the present disclosure provides an apparatus for controlling a virtual reality display device. The apparatus includes at least one processor, and a memory coupled to the at least one processor, configured to store computer instructions. The computer instructions, when executed by at least one processor, cause the apparatus to perform the method according to the first aspect of the present disclosure.

A third aspect of the present disclosure provides a method for execution in a virtual reality display device, wherein the virtual reality display device includes a display, an optical system, and a movement controller. In this method, an anti-distortion image is received by the display. The anti-distortion image is generated based on an original image according to distortion parameters of the optical system, and the anti-distortion image includes an effective image area and an invalid image area, the effective image area includes image information of the original image, the invalid image area includes movement control information for controlling movement of the display. Then, the display obtains movement control information from the invalid image area, and displays the anti-distortion image. Then, based on the movement control information, the movement of the display is controlled by the movement controller.

In the embodiment of the present disclosure, the display includes a display driver and a display panel.

In the embodiments of the present disclosure, the movement control information may be indicated by pixel values. Further, the display obtaining movement control information from the invalid image area includes extracting pixel values from pixels of the invalid image area by the display driver, and determining the corresponding movement control information based on the pixel values by the display driver, wherein the anti-distortion image is displayed by the display pane.

A fourth aspect of the present disclosure provides a virtual reality display device. The virtual reality device includes a display, an optical system provided on a viewing side of the display, and a movement controller. The display is configured to receive an anti-distortion image, wherein the anti-distortion image is generated based on an original image according to distortion parameters of the optical system, and the anti-distortion image includes an effective image area and an invalid image area, the effective image area includes image information of the original image, the invalid image area includes movement control information for controlling movement of the display, obtaining the movement control information from the invalid image area, and displaying the anti-distortion image. The movement controller is coupled to the display and is configured to control the movement of the display based on the movement control information.

In an embodiment of the present disclosure, the virtual reality display device may further include an apparatus according to the second aspect of the present disclosure, which is coupled to the display.

In an embodiment of the present disclosure, the display includes a display driver configured to receive the anti-distortion image and obtain movement control information from the invalid image area, and a display panel configured to display the anti-distortion image.

Further aspects and scope of adaptability become apparent from the description provided herein. It should be understood that various aspects of the present application may be implemented individually or in combination with one or more other aspects. It should also be understood that the description and specific embodiments herein are for illustrative purposes and are not intended to limit the scope of the application.

BRIEF DESCRIPTION OF THE DRAWINGS

The drawings described herein are only for the purpose of illustrations of the selected embodiments rather than any possible implementation, and they are not intended to limit the scope of this application, in which.

DETAILED DESCRIPTION

To make technical solutions and advantages of the embodiments of the present disclosure much clearer, the technical solutions of the embodiments of the present disclosure will be described clearly and completely with reference to the drawings of the embodiments of the present disclosure. Obviously, the described embodiments are only a part of the embodiments of the present disclosure, but not all the embodiments. According to the described embodiments of the present disclosure, all other embodiments obtained by a person of ordinary skill in the art without creative labor fall within the claimed scope of the present disclosure. Hereinafter, embodiments of the present disclosure will be described in detail with reference to the drawings and the embodiments. It should be noted that the features in the embodiments of the present disclosure can be combined with each other without conflict.

Generally, in a myopia correction system using a virtual reality display device, an image to be displayed is transmitted to a display, and movement control information for controlling a movement of the display is transmitted to an underlying driver. The underlying driver enables a movement controller, so that the movement controller controls the display to move according to the movement control information. However, debugging to transmit the movement control information to the underlying driver is complicated, and because the movement control information and the image are not transmitted synchronously, the synchronization of the movement of the display and the displaying of the image cannot be insured.

Figure 1:
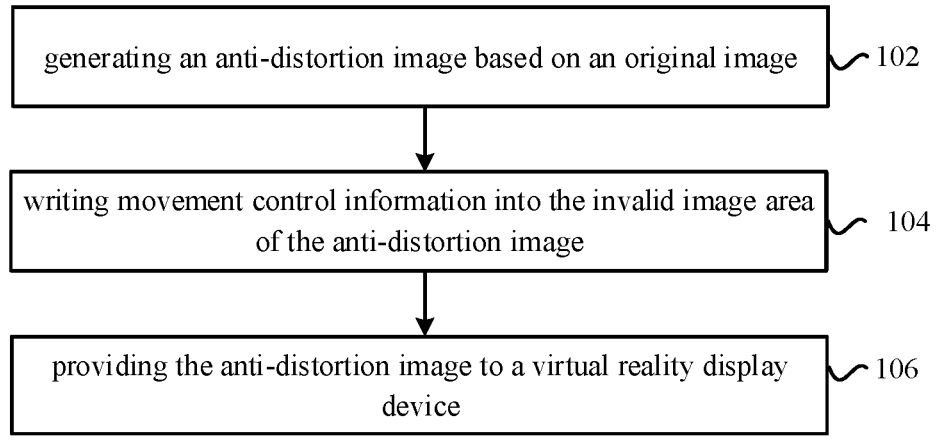
FIG. 1 is a schematic flowchart of a method for controlling a virtual reality display device according to an embodiment of the present disclosure.

FIG. 1 is a schematic flowchart of a method for controlling a virtual reality display device according to an embodiment of the present disclosure. The following describes the embodiment in detail with reference to the accompanying drawings.

In the embodiments of the present disclosure, the virtual reality display device includes a display, an optical system, and a movement controller. In one embodiment, the virtual reality display device may be a virtual reality head-mounted display device, which may be used for myopia correction.

In the virtual reality display device, in order to enable the user to obtain a real sense of immersion, the optical system uses an optical lens with a specific spherical curvature, such as a convex lens, to cover the user's visual range as much as possible. However, the optical lens distorts the image displayed on the display. In order to allow the user to view the normal original image, it is necessary to perform anti-distortion processing on the original image to provide the display with an anti-distortion image. In this way, when the anti-distortion image is displayed on the display, the user can view the normal original image through the optical lens.

The display in the virtual reality display device may be a liquid crystal display (LCD) or an organic light emitting diode display (OLED). In an embodiment of the present disclosure, the display may include a display panel and a display driver for driving the display panel.

The movement controller in the virtual reality display device is a hardware driver in the virtual reality display device, which is used to control the display to move to change the relative position between the display and the optical system. It should be understood that the virtual reality display device may also include other hardware drivers for driving other hardware.

In addition, the virtual reality display device may also include structural members (not shown) for fixing the display, optical system, and movement controller.

As shown in FIG. 1, in step 102, an anti-distortion image is generated based on the original image according to the distortion parameters of the optical system. In the embodiment of the present disclosure, the anti-distortion image has the same size as the original image, and includes an effective image area and an invalid image area. In the embodiments of the present disclosure, the optical system may be measured through the reverse optical path, and the distortion parameter of the optical system may be determined. Then, the original image is subjected to anti-distortion processing using the distortion parameter, so that the image information of the original image, such as pixel information, is included in the effective image area. If the optical system causes pillow distortion to the image, the anti-distortion process requires to cause barrel distortion to the image. If the optical system causes barrel distortion to the image, the anti-distortion process requires to cause pillow distortion to the image.

Figure 2:
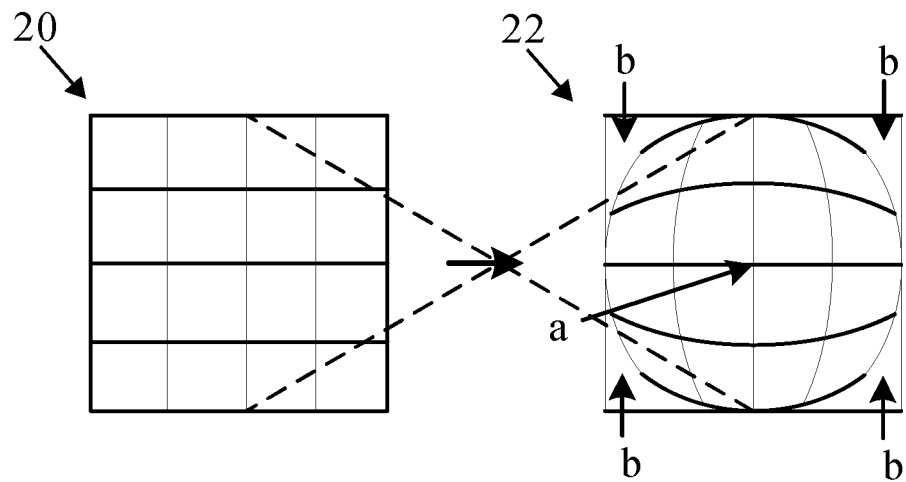
FIG. 2 shows a schematic diagram for generating an anti-distortion image from an original image.

FIG. 2 shows a schematic diagram of generating an anti-distortion image from an original image, where the original image 20 is shown on the left and the generated anti-distortion image 22 is shown on the right. As shown in FIG. 2, the anti-distortion image 22 may include an effective image area a located in the middle and an invalid image area b located at four corners. The effective image area a includes the image information of the original image 20, and in the invalid image area b, the pixel values of each pixel can be initialized to zero.

Then, in step 104, movement control information is written in the invalid image area b. In an embodiment of the present disclosure, the movement control information may include screen movement information, stop movement information, or screen position reset information. The screen movement information may indicate to move the display within a predetermined distance. The stop motion information may indicate to stop the display which is moving. The screen position restoration information may indicate to move the display to the initial position. Those skilled in the art may know that the movement control information is not limited to the above-mentioned information, it may also include other information related to the movement of the display.

In the embodiments of the present disclosure, movement control information may be indicated by pixel values. In one embodiment, eight-bit binary pixel values may be used to indicate movement control information. For example, the pixel value 00001111 indicates screen movement information that moves the display within a first distance, the pixel value 00000111 indicates screen movement information that moves the display within a second distance, the pixel value 00011111 indicates stop movement information, and the pixel value 00111111 indicates screen position restoration information.

Those skilled in the art may know that binary pixel values with other bit may also be used to indicate movement control information.

In the embodiment of the present disclosure, when writing the movement control information, the pixel value corresponding to the movement control information to be written may be determined, and the determined corresponding pixel value is written into the pixel of the invalid image area b. In an embodiment of the present disclosure, a mapping between movement control information and pixel values may be established and stored in advance. In the above example, if the movement control information to be written is screen movement information that moves the display within the first distance, the corresponding pixel value can be determined to be 00001111 according to the mapping. Then, the pixel value 00001111 is written into the pixel.

With continued reference to FIG. 1, in step 106, the virtual reality display device is provided with an anti-distortion image 22 including movement control information.

As can be seen from the above description, with the method according to the embodiment of the present disclosure, the movement control information can be written into the invalid image area of the anti-distortion image. In this way, the movement control information can be transmitted together with the image to be displayed, which ensures the synchronization between the displaying of image and the movement of the display, thereby effectively utilizing the transmission bandwidth.

Figure 3:
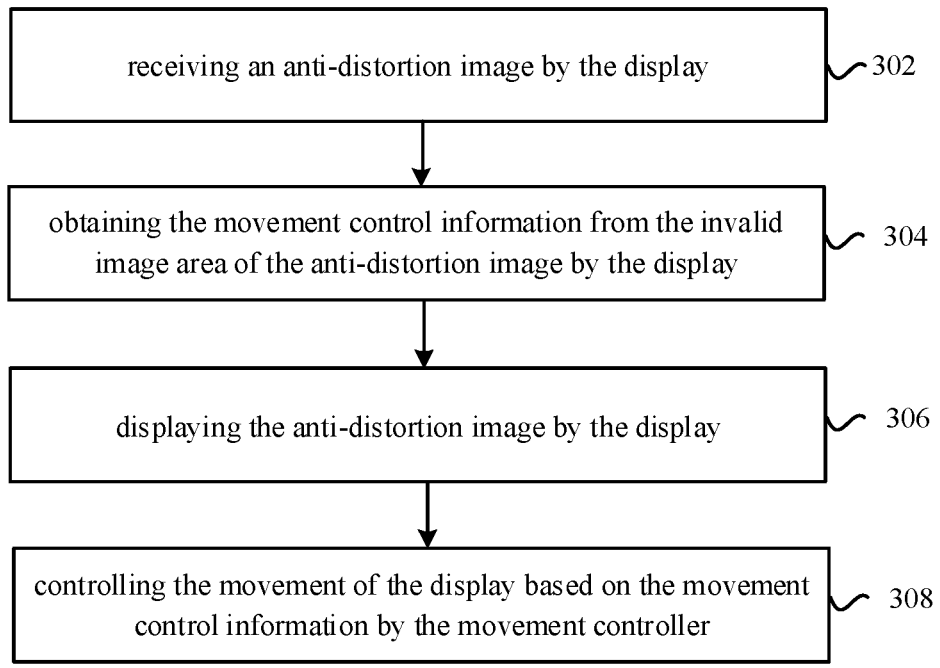
FIG. 3 is a schematic flowchart of a method for execution in a virtual reality display device according to an embodiment of the present disclosure.

FIG. 3 is a schematic flowchart of a control method for execution in a virtual reality display device according to an embodiment of the present disclosure. In the embodiment shown in FIG. 3, the virtual reality display device is the same as the virtual reality display device in the embodiment shown in FIG. 1.

As shown in FIG. 3, in step 302, the display receives an anti-distortion image. The anti-distortion image may be generated by the method in the embodiment shown in FIG. 1, for example, the anti-distortion image 22 in FIG. 2. As described above, the anti-distortion image may include an effective image area and an invalid image area. The effective image area includes image information of the original image, and the invalid image area includes movement control information of the display. As mentioned above, the display may include a display driver and a display panel. In this case, the anti-distortion image is received by the display driver.

Then, in step 304, the display obtains movement control information from the invalid image area of the anti-distortion image, and provides the movement control information to the movement controller. In the embodiment of the present disclosure, the movement control information is acquired by the display driver. As described above, the movement control information may be screen movement information, stop movement information, or screen position restoration information, and may be indicated by pixel values. The mapping between the movement control information and the pixel value can be stored in the memory of the display.

In an embodiment of the present disclosure, after receiving the anti-distortion image, the display driver may extract pixel values from the pixel of the invalid image area of the anti-distortion image. Then, based on the stored mapping, the movement control information corresponding to the extracted pixel value is determined. In the above example, if the extracted pixel value is 00001111, it may be determined that the movement control information is screen movement information that moving the display within the first distance.

Figure 6:
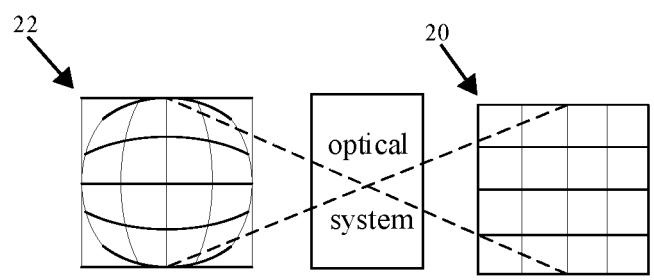
FIG. 6 shows the anti-distortion image transformed into the original image after being distorted by an optical system.

Next, in step 306, under the driving of the display driver, the anti-distortion image is displayed by the display panel. At this time, both the effective image area and the invalid image area will be displayed on the display panel. The displayed anti-distortion image is transformed into a normal original image after being distorted by the optical system. As shown in FIG. 6, the anti-distortion image 22 is transformed into the original image 20 after being distorted by the optical system. Therefore, the user can view the original image before the anti-distortion processing without seeing the invalid image area of the anti-distortion image.

In parallel with displaying the anti-distortion image, in step 308, after obtaining the movement control information, the movement controller may control the movement of the display according to the movement control information. For example, if the movement control information is screen movement information, the movement controller starts to move the display. If the movement control information is stop movement information, the movement controller stops moving the display. If the movement control information is the screen position restoration information, the movement controller moves the display to the initial position.

As can be seen from the above description, with the method according to the embodiment of the present disclosure, the display can obtain movement control information from the invalid image area of the anti-distortion image and provide it to the movement controller for controlling the movement of the display. Since the movement control information is transmitted together with the image to be displayed, the synchronization between the movement of the display and the displaying of the image can be ensured, thereby effectively utilizing the transmission bandwidth.

Figure 4:
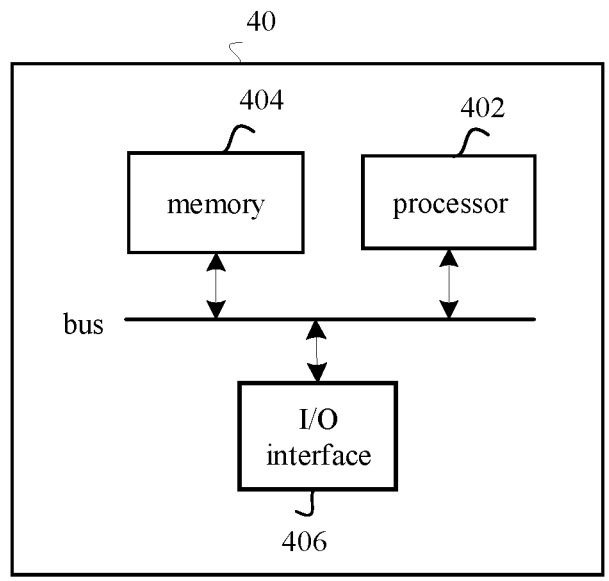
FIG. 4 shows a schematic block diagram of an apparatus for controlling a virtual reality display device according to an embodiment of the present disclosure.

FIG. 4 shows a schematic block diagram of an apparatus 40 for controlling a virtual reality display device according to an embodiment of the present disclosure. In this embodiment, the virtual reality display device is the same as the virtual reality display device in the embodiments shown in FIGS. 1 and 3.

As shown in FIG. 4, the apparatus 40 may include one or more processors 402, a memory 404, and an input/output interface (I/O) 406 for receiving external information and outputting information to other coupled devices. The memory 404 and one or more processors 402 are coupled to the I/O interface 406 through a bus, and stores computer instructions. When the computer instructions are executed by the processor 402, the apparatus 40 may execute the method for controlling the virtual reality display device as shown in FIG. 1. That is, the apparatus 40 can generate an anti-distortion image based on the original image according to the distortion parameters of the optical system. Then, the apparatus 40 writes movement control information into the invalid image area, and provides the anti-distortion image to the virtual reality display device.

In some embodiments of the present disclosure, the processor 402 may be, for example, a central processing unit CPU, a microprocessor, a digital signal processor (DSP), a processor based on a multi-core processor architecture, or the like. The memory 404 may be any type of memory implemented using data storage technology, comprising but not limited to random access memory, read-only memory, semiconductor-based memory, flash memory, magnetic disk memory, and the like.

Figure 5:
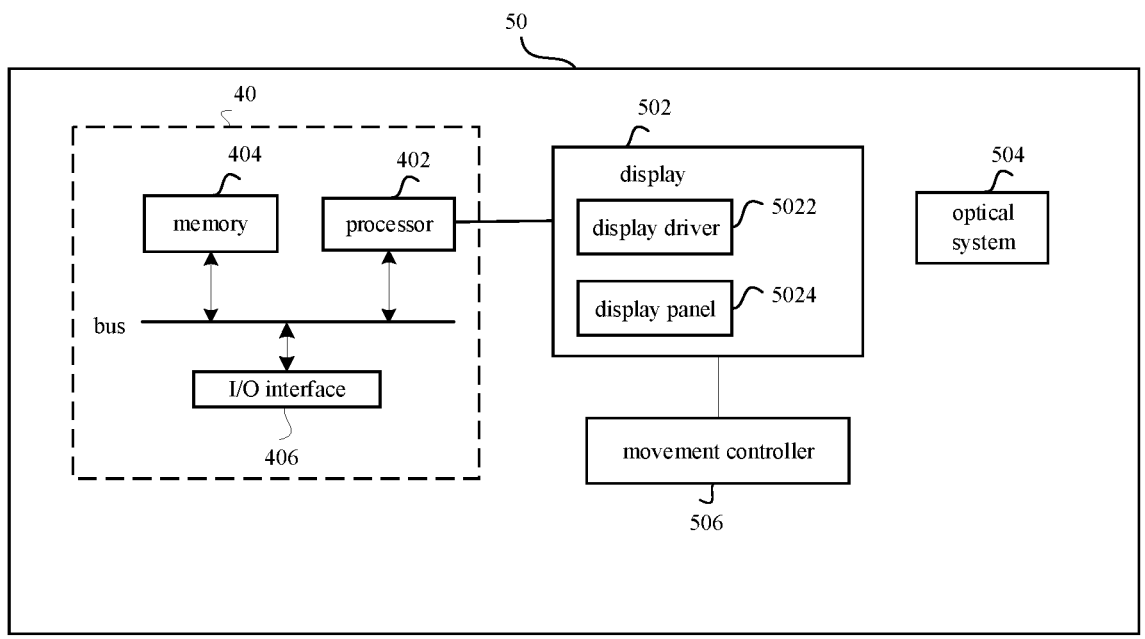
FIG. 5 shows a schematic block diagram of a virtual reality display device according to an embodiment of the present disclosure.

FIG. 5 shows a schematic block diagram of a virtual reality display device 50 according to an embodiment of the present disclosure. The virtual reality display device shown in FIG. 5 can be used as the virtual reality display device in the embodiments shown in FIGS. 1, 3, and 4. As shown in FIG. 5, the virtual reality device 50 includes a display 502, an optical system 504 provided on the viewing side of the display 502, and a movement controller 506 coupled to the display 502.

In an embodiment of the present disclosure, the display 502 may include a display panel 5024 and a display driver 5022 for driving the display panel 5024.

In an embodiment of the present disclosure, the display driver 5022 of the display 502 may be configured to receive an anti-distortion image. The anti-distortion image is generated based on the original image according to the distortion parameters of the optical system, and includes an effective image area and an invalid image area. The effective image area includes image information of the original image, and the invalid image area includes movement control information of the display 502. Further, the display panel 5024 of the display 502 can display the received anti-distortion image under the driving of the display driver 5022. The anti-distortion image is transformed into a normal original image after being distorted by the optical system 504. In addition, the display driver 5022 of the display 502 can also obtain movement control information from the invalid image area of the anti-distortion image, and provide the movement control information to the movement controller 506. The movement controller 506 can control the movement of the display 502 according to the movement control information.

In addition, in the embodiment of the present disclosure, the virtual reality display device 50 may further include the apparatus 40 shown in FIG. 4. The processor 402 of the apparatus 40 may be coupled to the display 502 to provide the display 502 with an anti-distortion image comprising movement control information of the display 502.

The specific embodiments of the present disclosure have been described above, but the scope of the present disclosure is not limited thereto. For those skilled in the art, the present disclosure may have various modifications and changes. Any modification, equivalent replacement, improvement, etc. within the spirit and principle of the present disclosure should be included in the protection scope of the present disclosure.

What is claimed is:

1. A method for controlling a virtual reality display device, the virtual reality display device comprising a display, an optical system, and a movement controller, the method comprising:
   generating an anti-distortion image based on an original image according to distortion parameters of the optical system, wherein the anti-distortion image comprises an effective image area and an invalid image area, and wherein the effective image area comprises image information of the original image;
   writing movement control information into the invalid image area, the movement control information used by the movement controller to control movement of the display; and
   providing the anti-distortion image to the virtual reality display device.

2. The method according to claim 1, wherein the movement control information is indicated by pixel values.

3. The method according to claim 2, wherein writing movement control information into the invalid image area comprises:
   determining pixel values corresponding to the movement control information; and
   writing the pixel values into pixels of the invalid image area.

4. The method according to claim 1, wherein the movement control information comprises any one of the following: screen movement information, stop movement information, and screen position restoration information.

5. An apparatus for controlling a virtual reality display device comprising:
   at least one processor; and
   a memory coupled to the at least one processor and configured to store computer instructions,
   wherein, the computer instructions, when executed by the at least one processor, cause the apparatus to perform the method of claim 1.

6. A method for execution in a virtual reality display device, the virtual reality display device comprising a display, an optical system, and a movement controller, the method comprising:
   receiving an anti-distortion image by the display, wherein the anti-distortion image is generated based on an original image according to distortion parameters of the optical system, wherein the anti-distortion image comprises an effective image area and an invalid image area, wherein the effective image area comprises image information of the original image, and wherein the invalid image area comprises movement control information for controlling movement of the display;
   obtaining the movement control information from the invalid image area by the display;
   displaying the anti-distortion image by the display; and
   controlling the movement of the display based on the movement control information by the movement controller.

7. The method according to claim 6, wherein the movement control information is indicated by pixel values.

8. The method according to claim 6, wherein the display comprises a display driver and a display panel.

9. The method according to claim 8, wherein obtaining the movement control information from the invalid image area by the display comprises:
   extracting pixel values from pixels of the invalid image area by the display driver; and
   determining the movement control information based on the pixel values by the display driver;
   wherein, the anti-distortion image is displayed by the display panel.

10. The method according to claim 6, wherein the movement control information comprises any one of the following: screen movement information, stop movement information, and screen position restoration information.

11. A virtual reality display device comprising a display, an optical system provided on a viewing side of the display, and a movement controller,
   wherein the display is configured to receive an anti-distortion image, wherein the anti-distortion image is generated based on an original image according to distortion parameters of the optical system, wherein the anti-distortion image comprises an effective image area and an invalid image area, wherein the effective image area comprises image information of the original image, and wherein the invalid image area comprises movement control information for controlling movement of the display, obtaining the movement control information from the invalid image area, and displaying the anti-distortion image, and wherein the movement controller is coupled to the display, and configured to control movement of the display based on the movement control information.

12. The virtual reality display device according to claim 11, further comprising:

the apparatus of claim 5 coupled to the display.

13. The virtual reality display device according to claim 11, wherein the display comprises:

a display driver configured to receive an anti-distortion image and obtain the movement control information from the invalid image area; and a display panel configured to display the anti-distortion image.

14. The method according to claim 2, wherein the movement control information comprises any one of the following: screen movement information, stop movement information, and screen position restoration information.

15. The apparatus according to claim 5, wherein the movement control information is indicated by pixel values.

16. The apparatus according to claim 15, wherein the computer instructions, when executed by the at least one processor, cause the apparatus to write movement control information into the invalid image area by the following operations:

determining pixel values corresponding to the movement control information; and writing the pixel values into pixels of the invalid image area.

17. The apparatus according to claim 5, wherein the movement control information comprises any one of the following: screen movement information, stop movement information, and screen position restoration information.

18. The method according to claim 7, wherein the display comprises a display driver and a display panel.

19. The method according to claim 7, wherein the movement control information comprises any one of the following: screen movement information, stop movement information, and screen position restoration information.

20. The virtual reality display device according to claim 12, wherein the display comprises:

a display driver configured to receive an anti-distortion image and obtain the movement control information from the invalid image area; and a display panel configured to display the anti-distortion image.

* * * * *